United States Patent [19]
Ciez et al.

[11] Patent Number: 5,348,352
[45] Date of Patent: Sep. 20, 1994

[54] ROTARY CONNECTOR WITH REMOVABLE SPOOL

[75] Inventors: Albert P. Ciez, Murrysville Boro; George A. Blasiole, Greensburg; William A. Bencloski, Herminie, all of Pa.

[73] Assignee: Westinghouse Electric Corporation, Pittsburgh, Pa.

[21] Appl. No.: 945,458

[22] Filed: Sep. 16, 1992

[51] Int. Cl.⁵ ............................................. F16L 39/04
[52] U.S. Cl. .................................. 285/136; 285/190; 285/134
[58] Field of Search ................ 285/134, 136, 190, 281

[56] References Cited

U.S. PATENT DOCUMENTS

| | | | |
|---|---|---|---|
| 1,121,202 | 12/1914 | Rembold | 285/134 |
| 1,523,822 | 1/1925 | Marret | 285/134 |
| 2,313,322 | 3/1943 | Carpenter | 285/134 |
| 2,805,087 | 9/1957 | Shaw et al. | 285/134 |
| 3,167,332 | 1/1965 | Simmers | 285/134 |
| 3,694,008 | 9/1972 | Slator et al. | 285/190 |
| 4,174,127 | 11/1979 | Carn et al. | 285/136 |
| 4,561,679 | 12/1985 | Choate | 285/190 |
| 4,606,560 | 8/1986 | McCracken | 285/190 |
| 4,635,969 | 1/1987 | Jackson | 285/190 |
| 4,928,997 | 5/1990 | Reisener et al. | 285/136 |
| 4,934,744 | 6/1990 | Samera, Jr. et al. | |
| 5,044,673 | 9/1991 | Jones, Jr. | |
| 5,098,135 | 3/1992 | Timm | 285/134 |

FOREIGN PATENT DOCUMENTS

| | | | |
|---|---|---|---|
| 517123 | 1/1931 | Fed. Rep. of Germany | 285/134 |
| 34187 | 5/1929 | France | 285/134 |
| 2272324 | 12/1975 | France | 285/136 |
| 486182 | 7/1973 | U.S.S.R. | 285/136 |

*Primary Examiner*—Eric K. Nicholson

[57] ABSTRACT

A rotary connector for coupling at least one stationary pipe to a rotating pipe includes a casing which is connected to a stationary inlet pipe and a stationary outlet pipe and which houses a rotary stem. The rotary stem includes an inner stem disposed within an outer stem for providing a first and second fluid flow path through the rotary stem. A spool is positioned between the rotary stem and the rotating pipe, which leads to a rotating piece of equipment, such as a combustor. The spool has an inner sleeve disposed within an outer sleeve for providing first and second fluid flow paths through the spool. The rotary connector also includes a seal for sealing an inboard end of the casing and a blind flange for sealing an outboard end of the casing. The fluid flows from the inlet pipe, through apertures in the outer stem, through an annulus between the inner and outer stems, through an annulus between the inner and outer sleeves of the spool, and into the coaxial pipe. After the fluid exits the rotary equipment, such as the combustor, the fluid flows back through the coaxial pipe, through the inner sleeve of the spool, through the inner stem of the rotary stem, through apertures in the outer stem and into the outlet pipe attached to the casing.

20 Claims, 2 Drawing Sheets

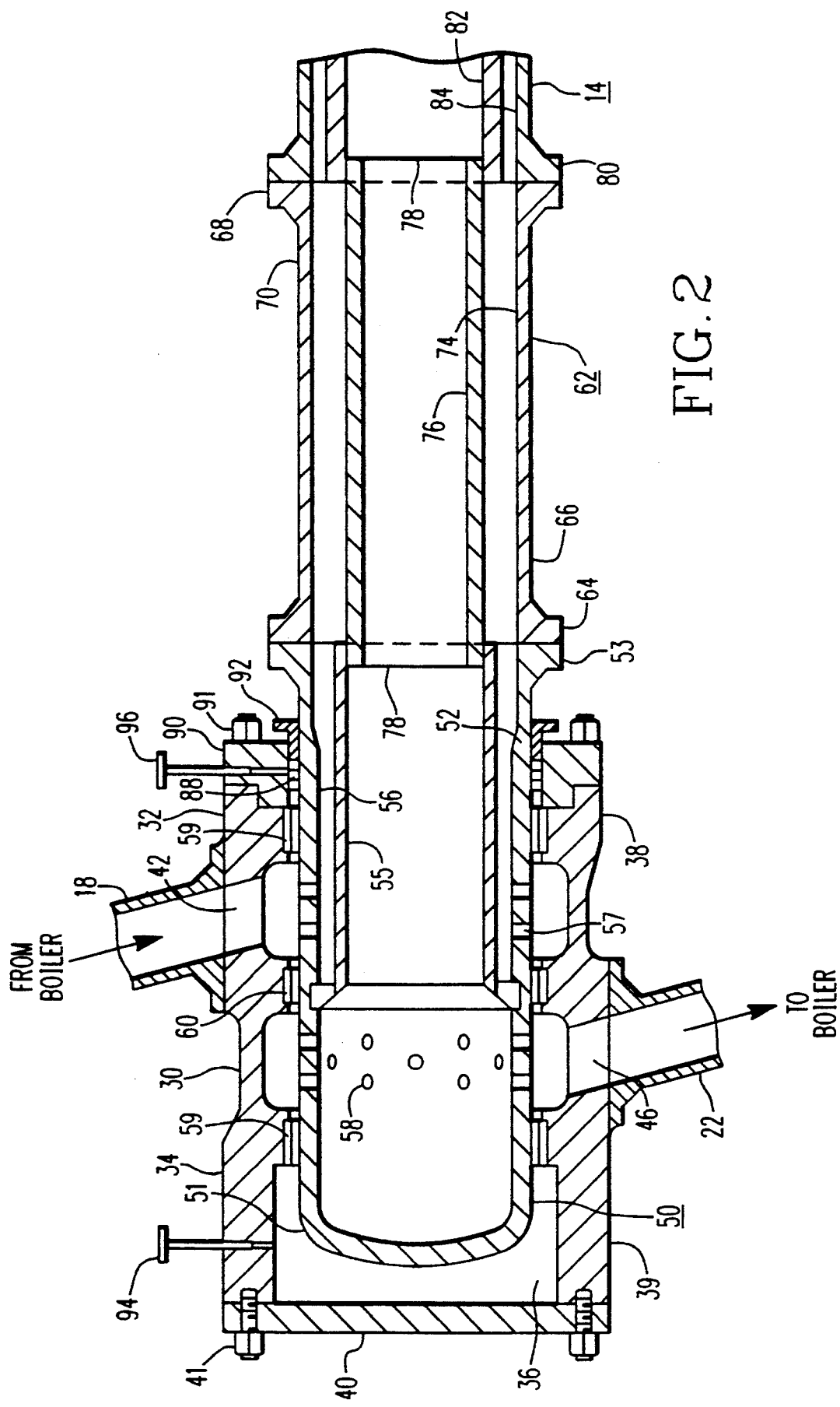

ROTARY CONNECTOR WITH REMOVABLE SPOOL

BACKGROUND OF THE INVENTION

This invention relates to rotary connectors and, more particularly, to a rotary connector which is easily disassembled due to the utilization of a spool and which minimizes maintenance and leakage due to the elimination of a dynamic seal.

During the operation of some rotary devices, such as a combustor, it is necessary to supply cooling water to the rotating device. The cooling water is supplied from, and returned to, a stationary water supply system. Therefore, the stationary water supply system, including the stationary inlet and outlet piping, must be connected to the rotating piping of the rotating device. A rotary connector is used to couple the rotating piping and the stationary piping together.

A rotary connector is described in U.S. Pat. No. 4,934,744 issued Jun. 19, 1990 to Samera, Jr. et al. The rotary connector includes a casing, a shaft tube assembly, and seal means. However, to disassemble the rotary connector for maintenance, such as replacement of the seal means, the inlet and outlet flanges, the coaxial pipe flange, and the outer casing supports need to be unbolted from the casing. When the rotary connector casing is moved, the rotary connector is no longer aligned with the combustor.

Another rotary connector is described in U.S. Pat. No. 5,044,673 issued Sep. 2, 1991 to Jones, Jr. The rotary connector includes a housing having an inner case and an outer case, a rotary stem, an inboard sealing assembly and an outboard sealing assembly. Because the rotary connector uses two dynamic seals, there is an increased potential for leakage and need for maintenance.

Therefore, what is needed is a rotary connector which may be disassembled without removing the inlet and outlet flanges or the outer casing supports and which utilizes only one dynamic seal, thereby reducing maintenance and downtime.

SUMMARY OF THE INVENTION

A rotary connector for coupling a rotating pipe to a stationary inlet pipe and a stationary outlet pipe includes a casing having an inboard end, an outboard end, and a cylindrical passage that extends between the ends of the casing. The casing has an inlet passage that communicates with the cylindrical passage and an outlet passage that communicates with the cylindrical passage.

A rotary stem, which is positioned within the cylindrical passage of the casing, has a closed end, an open end, a first accessway for providing a first fluid flow path between the stationary inlet pipe and the rotating pipe, and a second accessway for providing a second fluid flow path between the stationary outlet pipe and the rotating pipe.

The rotary connector also includes a removable spool, which has a first end connected to the rotary stem and a second end connected to the rotating pipe. The removable spool has a first fluid flow path between the stationary inlet pipe and the rotating pipe, and a second fluid flow path between the stationary outlet pipe and the rotating pipe.

A seal is positioned adjacent to the rotary stem for sealing the rotary stem within the casing. The rotary connector also includes a blind flange attached to the outboard end of the casing for containing fluid passing through the second accessway of the rotary stem within the casing prior to passage through the outlet pipe.

The utilization of the spool enables the rotary stem to be easily removed, while maintaining the alignment of the rotary connector to the combustor. The rotary connector does not have to be realigned with the combustor because the rotary stem can be removed without unbolting the inlet pipe, the outlet pipe, and the outer casing supports. The spool is a simple conventional pipe connection having flange connections between the rotary stem and spool and between the coaxial pipe and the spool.

An extension of the casing beyond the end of the rotary stem enables the utilization of the blind flange, thereby eliminating the use of a dynamic seal between the rotary stem and the casing to seal the outboard end of the casing. The utilization of only one dynamic seal between the rotary stem and the casing to seal the inboard end of the casing, instead of the two dynamic seals, reduces the cost of the rotary connector due to the use of less parts, reduces maintenance and downtime, minimizes the potential for leakage of coolant, and increases reliability of the rotary connector.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 2 is a sectional view of the rotary connector.

DESCRIPTION OF THE PREFERRED EMBODIMENT

Figure 1:
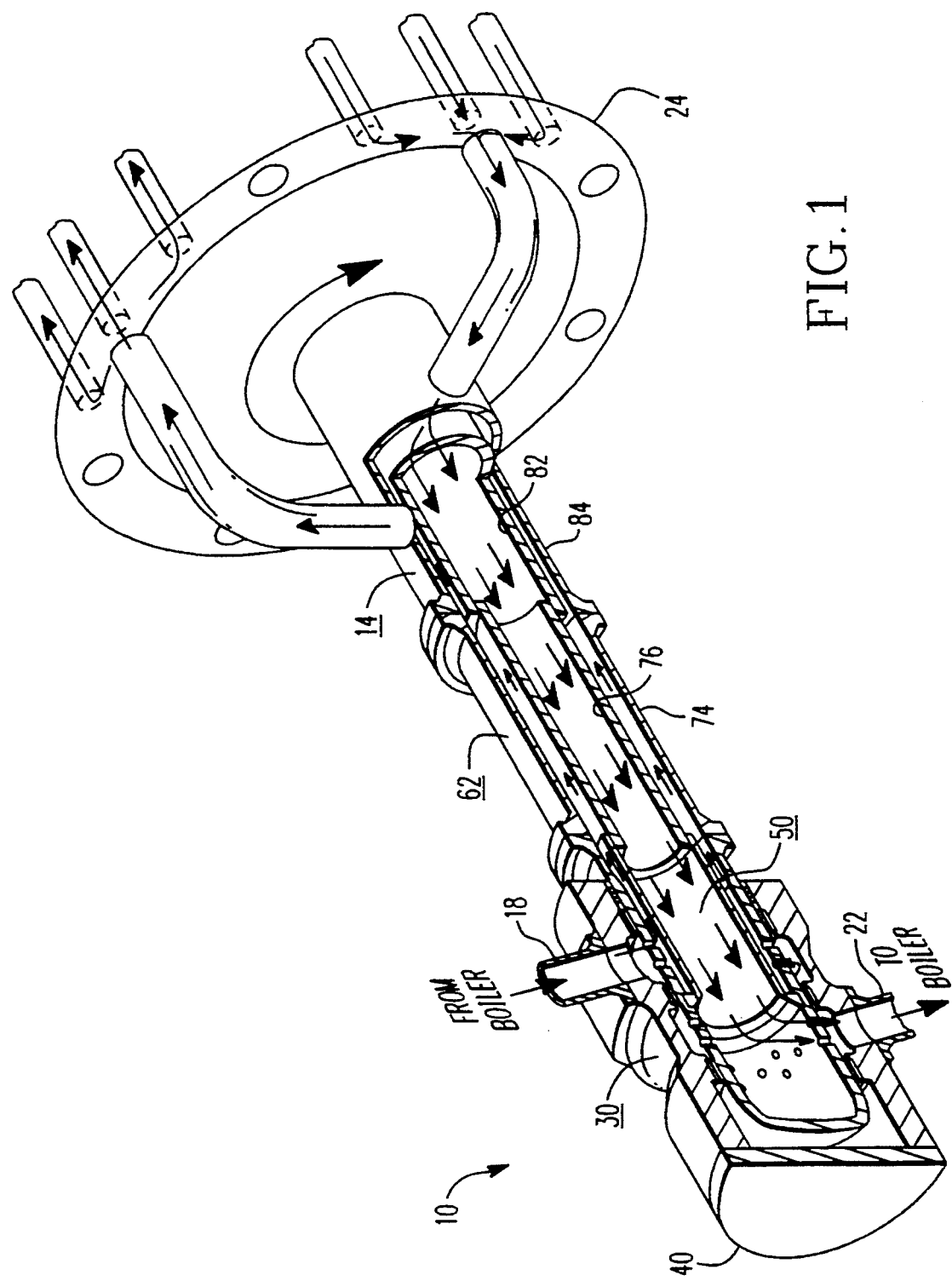
FIG. 1 is a schematic representation of a rotary connector which connects stationary pipes to a rotating pipe.

The invention described herein provides a rotary connector for connecting a rotating pipe to a stationary pipe which utilizes a spool for disassembly of the rotary connector without removing the inlet and outlet flanges or the outer casing supports and which requires an effective seal between the rotary pipe and the stationary casing at only one end of the stationary casing.

Referring to FIG. 1, a rotary connector 10 connects a rotating coaxial pipe 14 to a stationary inlet pipe 18 and a stationary outlet pipe 22. The coaxial pipe 14 is connected to a rotary combustor 24, which is a water cooled rotating barrel made of steel tubes and bars. The rotary connector 10 is a component for conveying cooling water to and from the combustor 24. The combustor 24 is used as an illustration only. The rotary connector 10 may be used for any device which requires a connection between stationary and rotating parts.

Referring to FIGS. 1 and 2, the rotary connector 10 includes a stationary housing or casing 30 having an inboard end 32, an outboard end 34, and a cylindrical passage 36 extending between the ends of the casing 30. The inboard end 32 of the casing 30 terminates as a flange 38. The outboard end 34 of the casing 30 terminates as a flange 39. A cover plate or blind flange 40 is attached to the flange 39 of the casing 30, such as by bolts 41, for sealing the outboard end 34 of the casing 30 to retain high pressure water within the casing 30. A seal, such as a gasket, may be positioned between the blind flange 40 and the flange 39.

The casing 30 has an inlet passage 42 which communicates with the interior of the casing 30. The inlet passage 42 has a flange for connection to a cooling water inlet pipe 18. The casing 30 has an outlet passage 46 which communicates with the interior of the casing 30. The outlet passage 46 has a flange for connection to a cooling water outlet pipe 22.

A rotary stem 50, which has a closed end 51 and an open end 52, is positioned within the cylindrical passage 36 of the casing 30. The open end 52 terminates as a flange 53. When the rotary stem 50 is positioned within the casing 30, the closed end 51 is located near the outboard end 34 of the casing 30, the open end 52 is located near the inboard end 32 of the casing 30, and the flange 53 extends beyond the inboard end 32 of the casing 30.

The rotary stem 50 includes an inner stem 55 and an outer stem 56. The inner stem 55 is disposed within the outer stem 56 for providing two fluid flow paths. The outer stem 56 has a first plurality of circumferentially positioned apertures 57 for providing a first accessway for fluid flowing through the inlet passage 42 of the casing 30. The fluid flows from the inlet passage 42 through the apertures 57 into the annulus between the inner stem 55 and the outer stem 56. This fluid flow path directs the fluid from the inlet passage 42 of the casing 30 towards the rotary combustor 24 or any other rotary unit which may be connected to the rotary connector 10.

The outer stem 56 has a second plurality of circumferentially positioned apertures 58 for providing a second accessway for fluid flowing through the outlet passage 46 of the casing 30. The fluid flows through the inner stem 55 and through the apertures 58 of the outer stem 56 into the outlet passage 46. This second fluid flow path directs the flow of fluid from the rotary combustor 24 or other rotary unit towards the outlet passage 46 of the casing 30.

A plurality of conventional bearings 59 support and center the rotary stem 50 within the casing 30. A tight clearance bushing 60 is positioned between the first apertures 57 and the second apertures 58 for controlling or minimizing leakage between the inlet passage 42 and the outlet passage 44.

A spool 62 is attached to the rotary stem 50. The spool 62 has a first flange 64 positioned at a first axial end 66 and a second flange 68 positioned at a second axial end 70. The first flange 64 is connected, such as by bolting, to the flange 53 of the rotary stem 50.

The spool 62 includes an outer sleeve 74 and an inner sleeve 76. The inner sleeve 76 is disposed within the outer sleeve 74 for providing two fluid flow paths through the spool 62. The fluid, which flows from the inlet passage 42 towards the rotary combustor 24, flows from the annulus between the inner stem 55 and the outer stem 56 of the rotary stem 50 through the annulus between the inner sleeve 76 and the outer sleeve 74 of the spool 62. The fluid, which flows from the combustor 24 towards the outlet passage 46, flows through the inner sleeve 76 of the spool 62 into the inner stem 55 of the rotary stem 50. The ends 78 of the inner sleeve 76 of the spool 62 extend beyond the first axial end 66 and second axial end 70 of the spool 62. The diameter of the inner sleeve 76 of the spool 62 is smaller than the diameter of the inner stem 55 of the rotary stem 50 so that the inner sleeve 76 can be positioned within the inner stem 55 when the flange 64 of the spool 62 and the flange 53 of the rotary stem 50 are connected together.

The spool 62 is connected to the coaxial pipe 14, which connects to the rotary combustor 24 or other rotary unit. The second flange 68 of the spool 62 is connected, such as by bolting, to a flange 80 of the coaxial pipe 14. The coaxial pipe 14 includes an inner pipe 82 and an outer pipe 84. The fluid, which flows from the inlet passage 42 towards the rotary combustor 24, flows through the annulus between the inner pipe 82 and the outer pipe 84. The fluid, which flows from the combustor 24 towards the outlet passage 46, flows through the inner pipe 82. The diameter of inner sleeve 76 of the spool 62 is smaller than the diameter of the inner pipe 82 of the coaxial pipe 14 so that the inner sleeve 76 can be positioned within the inner pipe 82 when the flange 68 of the spool 62 and the flange 80 of the coaxial pipe 14 are connected together.

As an alternative to the ends 78 of the inner sleeve 76 extending beyond the axial ends of the spool 62, the ends 78 of the inner sleeve may be flush with the flanges 64 and 68 so that the inner sleeve 76 abuts the inner pipe 82 of the coaxial pipe 14 and the inner stem 55 of the rotary stem 50.

For maintenance or replacement of components of the rotary connector 10, the spool 62 is unbolted from the coaxial pipe 14 and from the rotary stem 50. The spool 62 is removed. The rotary stem 50 is withdrawn from the casing 30 through the inboard end 32 of the casing 30. The utilization of the spool 62 enables the rotary connector 10 to be disassembled without unbolting the inlet pipe 18, the outlet pipe 22, and the casing supports which maintain the alignment of the rotary connector 10 with the combustor 24.

A seal 88, which is positioned between the first plurality of apertures 57 and the flange 53 of the rotary stem 50, provides the dynamic seal between the stationary casing 30 and the rotating rotary stem 50. The seal 88 is contained within a housing 90, which is attached, such as by bolts 91, to the flange 38 at the inboard end 32 of the casing 30. A cylindrical member 92, which is attached to the housing 90, provides support for the seal 88. The seal 88 may be a packing, which is a layer or ring of compressible or elastic material, such as woven fabric, metallic rings, or a composite of thin sheets laminated together. Alternatively, the seal 88 may be a mechanical seal.

A first drain 94 is positioned between the casing 30 and the outboard end 34 of the rotary stem 50 for draining excess fluid from within the casing 30. The drain 94 may be positioned adjacent the blind flange 40 or may be positioned within the outlet passage 46 of the casing 30. A second drain 96 is positioned adjacent the seal 88 for removing excess fluid from the seal 88.

Therefore, the invention provides a rotary connector which utilizes a spool for easy removal of the rotary stem while maintaining alignment of the rotary connector and which utilizes a blind flange for elimination of a dynamic seal for minimizing leakage and reducing maintenance, downtime, and costs.

What we claim is:

1. A rotary connector for coupling a rotating pipe to at least one stationary pipe, comprising:
   a casing having an inboard end, an outboard end, a cylindrical passage extending between said ends of said casing, and a passage from each stationary pipe communicating with said cylindrical passage;

a rotary stem, positioned within said cylindrical passage of said casing, having a closed end, an open end, and a fluid flow path between each stationary pipe and said rotating pipe;

a removable spool having a first end removably connected to said rotary stem and a second end removably connected to said rotating pipe, said removable spool having a fluid flow path between each stationary pipe and said rotating pipe; and a seal attached to said casing and positioned adjacent to said rotary stem for sealing said rotary stem within said casing said seal being located proximate the inboard end of the casing with no dynamic seal being located between said casing and said rotary stem outboard thereof.

2. The rotary connector according to claim 1, further comprising a blind flange attached to said outboard end of said casing for containing fluid within said casing.

3. The rotary connector according to claim 1, wherein said rotary stem has an outer stem and an inner stem, said inner stem being disposed within at least a portion of said outer stem to form an annulus between said inner stem and said outer stem for providing one of said fluid flow paths from one of said stationary pipes, through said rotary stem, and towards said spool, said inner stem providing another of said fluid flow paths from said spool, through said rotary stem, and towards another of said stationary pipes.

4. The rotary connector according to claim 3, wherein said outer stem further comprises a first plurality of apertures for providing one of said fluid flow paths between one of said stationary pipes and said rotating pipe and a second plurality of apertures for providing another of said fluid flow paths between another of said stationary pipes and said rotating pipe.

5. The rotary connector according to claim 1, wherein said spool has an outer sleeve and an inner sleeve, said inner sleeve being disposed within said outer sleeve to form an annulus between said inner sleeve and said outer sleeve for providing one of said fluid flow paths from said rotary connector, through said spool, and towards said rotating pipe, said inner sleeve providing another of said fluid flow paths from said rotating pipe, through said spool, and towards said rotary connector.

6. The rotary connector according to claim 1, further comprising at least one bearing positioned between said casing and said rotary stem for supporting said rotary stem within said casing and allowing said rotary stem to rotate.

7. The rotary connector according to claim 4, further comprising a bushing positioned between said first plurality of apertures and said second plurality of apertures.

8. A rotary connector for coupling a rotating pipe to a stationary inlet pipe and a stationary outlet pipe, comprising:

a casing having an inboard end, an outboard end, a cylindrical passage extending between said ends of said casing, an inlet passage communicating with said cylindrical passage, and an outlet passage communicating with said cylindrical passage;

a rotary stem, positioned within said cylindrical passage of said casing, having a closed end, an open end, a first accessway for providing a first fluid flow path between said stationary inlet pipe and said rotating pipe, and a second accessway for providing a cinched fluid flow path between said stationary outlet pipe and said rotating pipe;

a removable spool having a first end removably connected to said rotary stem and a second end removably connected to said rotating pipe, said removable spool having a first fluid flow path between said stationary inlet pipe and said rotating pipe, and a second fluid flow path between said stationary outlet pipe and said rotating pipe, said spool being removable when unconnected from said rotary stem and from said rotating pipe so that the rotary stem can be withdrawn through the inboard end of the casing for maintenance or replacement of components; and a seal attached to said casing and positioned adjacent said rotary stem for sealing said rotary stem within said casing.

9. The rotary connector according to claim 8, further comprising a blind flange attached to said outboard end of said casing for containing fluid passing through said second accessway of said rotary stem within said casing prior to passage through said outlet pipe.

10. The rotary connector according to claim 8, wherein said rotary stem has an outer stem and an inner stem, said inner stem being disposed within at least a portion of said outer stem to form an annulus between said inner stem and said outer stem for providing said first fluid flow path from said inlet pipe, through said rotary stem, and towards said spool, said inner stem providing said second fluid flow path from said spool, through said rotary stem, and towards said outlet pipe.

11. The rotary connector according to claim 10, wherein said outer stem further comprises a first plurality of apertures for providing said first accessway between said inlet pipe and said rotating pipe and a second plurality of apertures for providing said second accessway between said outlet pipe and said rotating pipe.

12. The rotary connector according to claim 8, wherein said spool has an outer sleeve and an inner sleeve, said inner sleeve being disposed within said outer sleeve to form an annulus between said inner sleeve and said outer sleeve for providing said first fluid flow path from said rotary connector, through said spool, and towards said rotating pipe, said inner sleeve providing said second fluid flow path from said rotating pipe, through said spool, and towards said rotary connector.

13. The rotary connector according to claim 8, further comprising at least one bearing positioned between said casing and said rotary stem for supporting said rotary stem within said casing and allowing said rotary stem to rotate.

14. The rotary connector according to claim 11, further comprising a bushing positioned between said first plurality of apertures and said second plurality of apertures for minimizing leakage between said inlet passage and said outlet passage.

15. The rotary connector according to claim 8, further comprising a drain positioned adjacent to said seal for removing fluid from said seal.

16. The rotary connector according to claim 8, further comprising a drain positioned at said outboard end of said casing for removing fluid from said outboard end.

17. The rotary connector according to claim 8, wherein said open end of said rotary stem terminates as a flange and said spool has a flange for connection to said flange of said rotary stem.

18. A rotary connector for coupling a rotating pipe to a stationary inlet pipe and a stationary outlet pipe, comprising:

a casing having an inboard end, an outboard end, a cylindrical passage extending between said ends of said casing, an inlet passage communicating with said cylindrical passage, and an outlet passage communicating with said cylindrical passage;

a rotary stem, positioned within said cylindrical passage of said casing, having a closed end, an open end terminating as a flange, an inner stem, and an outer stem having a plurality of apertures, said rotary stem having at least a portion of said inner stem disposed within said outer stem for forming an annulus between said inner and outer stem for providing a first fluid flow path between said stationary inlet pipe and said rotating pipe, said inner stem providing a second fluid flow path between said rotating pipe and said stationary outlet pipe;

a removable spool having a first flange for removable connection to said flange of said rotary stem and a second flange for removable connection to said rotating pipe, said removable spool having an inner sleeve disposed within an outer sleeve for forming an annulus between said sleeves for providing a first fluid flow path between said stationary inlet pipe and said rotating pipe, said inner sleeve providing a second fluid flow path between said stationary outlet pipe and said rotating pipe, said spool being removable when unconnected from said rotary stem and from said rotating pipe so that the rotary stem can be withdrawn through the inboard end of the casing for maintenance or replacement of components;

a seal attached to said casing and positioned adjacent to said rotary stem for sealing said rotary stem within said casing; and a blind flange attached to said flange positioned at said outboard end of said casing for containing fluid passing through said second fluid flow path of said rotary stem within said casing prior to passage through said outlet pipe.

19. The rotary connector according to claim 18, wherein at least one end of said inner sleeve of said spool extends beyond said flanges of said spool for engagement with at least one of said rotating pipe and said inner stem.

20. The rotary connector according to claim 8 wherein: said seal is located proximate the inboard end of the casing with no dynamic seal being located between said casing and said rotary stem outboard thereof.

* * * * *